United States Patent [19]
Kem

[11] Patent Number: 4,991,170
[45] Date of Patent: Feb. 5, 1991

[54] CIRCUIT FOR INTERFACING A DIGITAL SIGNAL PROCESSOR TO A SERIAL INTERFACE CONTROLLER

[75] Inventor: Han Kem, Glendale, Ariz.

[73] Assignee: AG Communication Systems Corporation, Phoenix, Ariz.

[21] Appl. No.: 380,370

[22] Filed: Jul. 17, 1989

[51] Int. Cl.$^5$ .............................................. H04J 3/00
[52] U.S. Cl. .................................. 370/85.1; 370/85.9
[58] Field of Search ................ 370/85.1, 85.2, 85.3, 370/85.4, 85.5, 85.9, 85.11, 85.12; 364/900

[56] References Cited
U.S. PATENT DOCUMENTS
4,754,274  6/1988  Iles ................................. 370/85.1 X OTHER PUBLICATIONS
Money, Steve A., Microprocessor data book, 1982, pp. 129, 130.
Motorola Inc., MC68008, Nov. 1982, p. 1—1.

Primary Examiner—Douglas W. Olms
Assistant Examiner—H. Kizou
Attorney, Agent, or Firm—Anthony J. Baca

[57] ABSTRACT

An interface circuit which connects a Digital-Signal-Processor (DSP) to a serial controller. The interface circuit includes a bi-directional multiplexer which converts the separate address and data busses of the DSP to the multiplexed data and address bus of the serial controller. A timing generator is included for keeping track of the number of clock cycles in the present access. A decoder connected to the timing generator decodes the number of clock cycles and generates the appropriate control signals to both the serial controller and the DSP.

11 Claims, 3 Drawing Sheets

WRITE CYCLE

READ CYCLE

CIRCUIT FOR INTERFACING A DIGITAL SIGNAL PROCESSOR TO A SERIAL INTERFACE CONTROLLER

FIELD OF THE INVENTION

The present invention relates in general to digital circuits, particularly to a circuit that allows a Digital-Signal-Processor (DSP) to interface with a serial interface controller.

BACKGROUND OF THE INVENTION

DSPs, because of their high speed and vast arithmetic capabilities, are being used in many electronic circuit designs. Many of these circuit designs require the DSP to interface with a serial controller. While there exists a small number of serial controllers that can easily interface to a DSP, these serial controllers do not provide the wealth of functions required by many circuit designs.

Prior to the present invention, the problem of interfacing a DSP to a feature rich serial controller was solved by; using a serial controller that easily interfaces with the DSP, not using a DSP, or using an I/O processor between the DSP and the serial controller. The first two choices may require that some features either be emulated by firmware or not supported at all. While the latter choice adds additional hardware and firmware design effort.

Accordingly, it is the objective of the present invention to provide an interface circuit that allows the DSP to interface directly with the serial controller.

SUMMARY OF THE INVENTION

In accomplishing the objective of the present invention there is provided an interface circuit for connecting a Digital-Signal-Processor (DSP) to a serial controller. Where the DSP has separate address and data busses and the serial controller has a multiplexed data and address bus. The interface circuit generates a plurality of control signals which defines the type of access being performed.

The interface circuit comprises: A timing generator that receives a clock signal from the DSP, a first indication signal from the DSP which signifies that the DSP is performing a valid access, and a second indication signal from the DSP which signifies that the DSP is accessing the serial controller. Responsive to receiving the first indication signal and the second indication signal, the timing generator generates a plurality of signals which represent a number of cycles of the clock signal.

A decoder receives the plurality of signals from the timing generator and generates the plurality of control signals.

A multiplexer receives a first control signal from the decoder, responsive to receiving the first control signal the multiplexer connects the address bus to the multiplexed data and address bus. Alternatively, the multiplexer responsive to an absence of the first control signal, connects the data bus to the multiplexed data and address bus. The multiplexer also receives a direction signal from the DSP, wherein, the direction signal defines a direction of flow through the multiplexer.

DESCRIPTION OF THE DRAWINGS

A better understanding of the invention may be had from the consideration of the following detailed description taken in conjunction with the accompanying drawings in which.

DESCRIPTION OF THE PREFERRED EMBODIMENT

With the aid of FIG. 1, an overall description of the present invention will now be given. All of the signal leads associated with the Digital-Signal-Processor (DSP) are shown on the left of FIG. 1, and those signal leads associated with the serial controller are shown on the right.

Bi-directional mux 101 is used to convert the separate address and data busses of the DSP to the multiplexed data and address bus of the serial controller. Timing generator 102 keeps track of the cycle number of the present access. Decoder 103 decodes the current cycle number and generates the appropriate control signals to the serial controller and the DSP.

The signal STROBE from the DSP, signifies that a valid access is occurring, and the signal SELECT signifies that the interface circuit is being accessed. Therefore, both signals will be active when the serial controller is being accessed. Once both STROBE and SELECT signal become active, the signal CHIP_SELECT, to the serial controller, becomes active. Also, timing generator 102 starts to count the clock cycles. At this time mux 101 is enabled and passes the DSP's address onto the DAL bus of the serial controller.

After a predetermined number of clock cycles, mux 101 switches from passing address to passing data. The direction of data flow is determined by the signal READ/~WRITE from the DSP. A predetermined number of clock cycles after mux 101 has switched to data, decoder 103 will generate either READ_ENABLE or WRITE_ENABLE. When the DSP has finished this access, SELECT and STROBE become inactive, forcing timing generator 102 to reset and wait for the next access.

Decoder 103 generates a few additional signals that will now be discussed. The signal INTERRUPT_ACK is a time-sequenced-interrupt-acknowledge to the serial controller. READY, signals to the DSP that the serial controller is ready to continue.

With the aid of FIGS. 2, 3, and 4, a detailed description of the operation of the present invention will be given.

Figure 1:
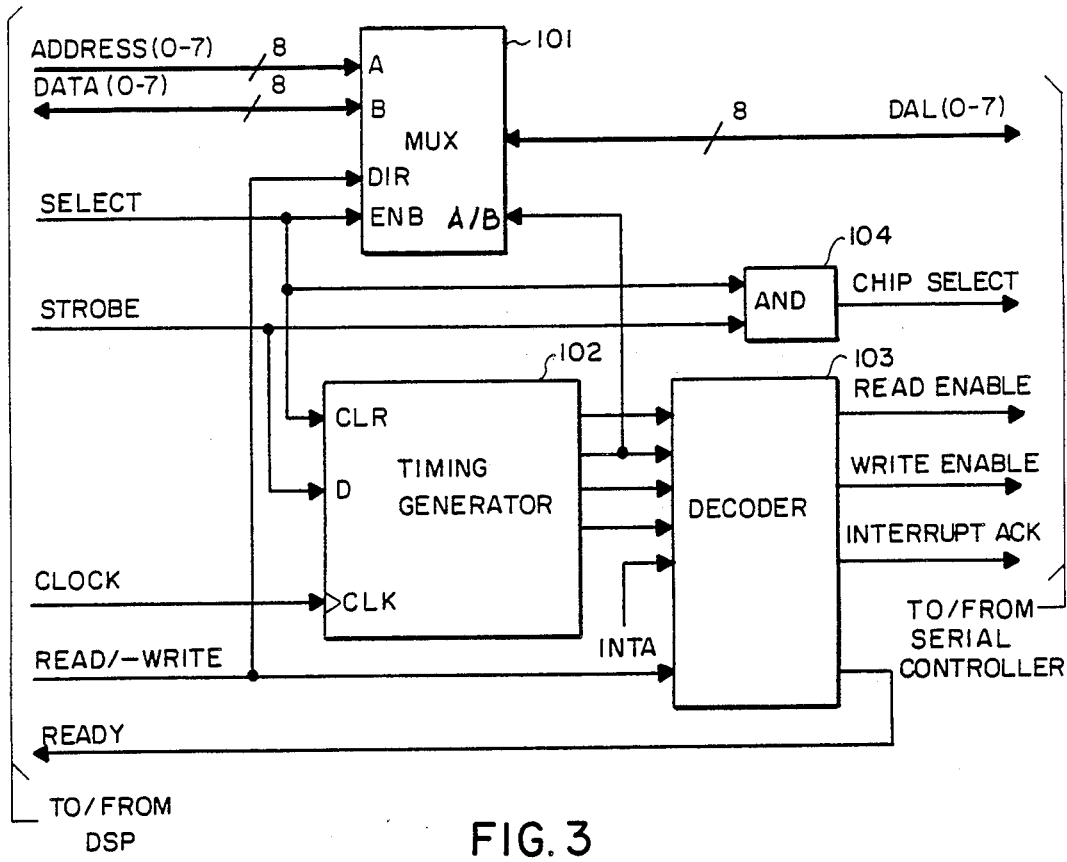
FIG. 1 is a block diagram of the interface circuit.
Figure 2:
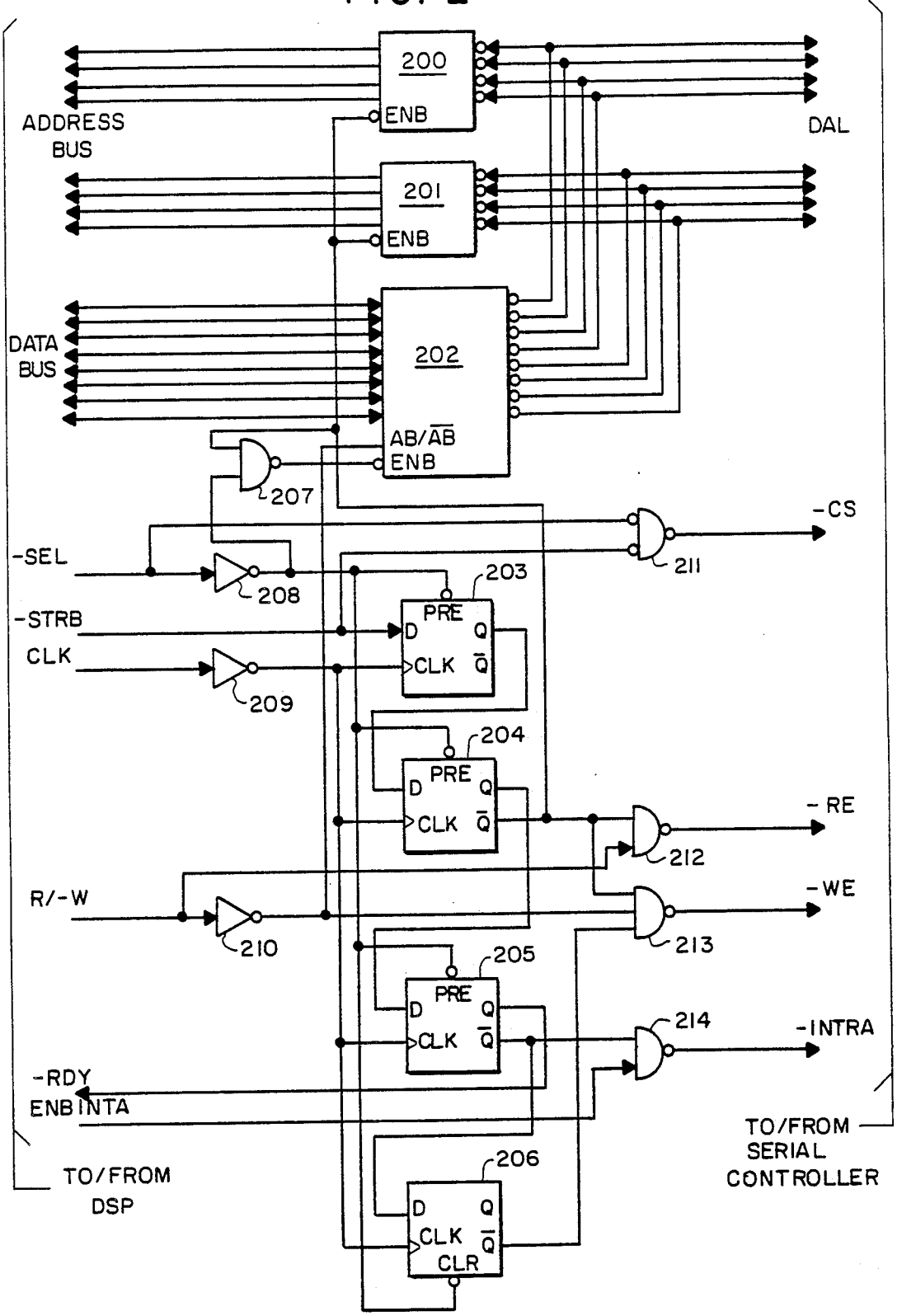
FIG. 2 is a schematic diagram of the synchronizer circuit, in accordance with the present invention.

Mux 101 of FIG. 1 is comprised of drivers 200, 201, and 202 of FIG. 2. Where, drivers 200 and 201 control placing the address onto DAL, and driver 202 controls the data bus. Timing generator 102 of FIG. 1 is comprised of D-FFs 203, 204, 205, and 206 of FIG. 2. The remaining gates of FIG. 2 make-up decoder 103 of FIG. 1.

The DSP indicates that it is accessing the serial controller by forcing both -SEL and -STRB to a logic low. The serial controller is activated by the output of gate 211 (-CS) becoming a logic low. The logic low of -SEL, through inverter 208, removes the preset (PRE) signal from D-FFs 203, 204, 205 and the clear (CLR) signal from D-FF 206, thereby enabling the timing generator.

During this time drivers 200 and 201 are both enabled allowing the address bus from the DSP to drive the DAL bus of the serial controller. Referring to FIG. 3, DAL now represents address information.

Figure 3:
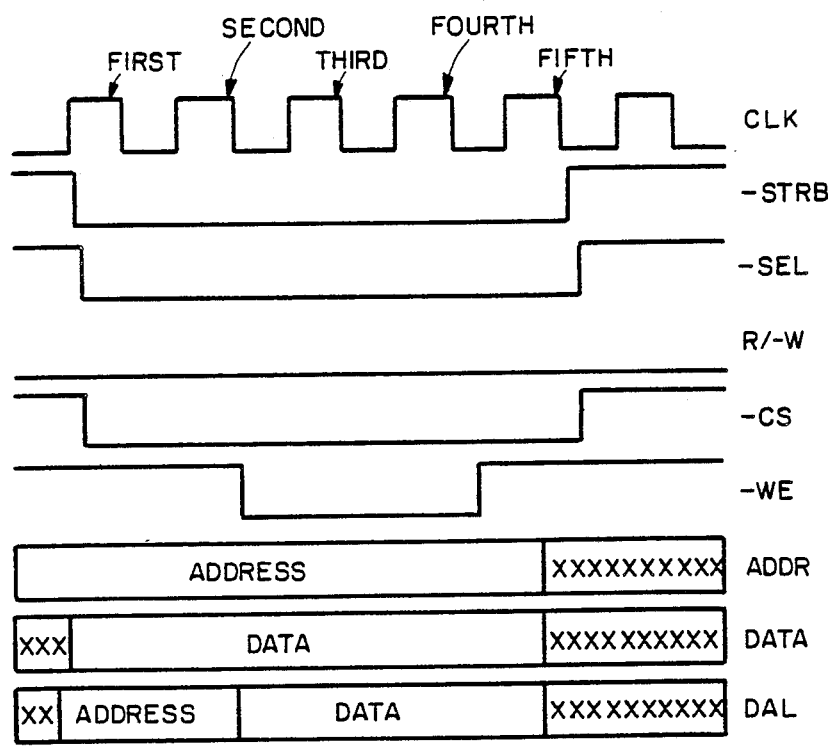
FIG. 3 is a timing diagram for the circuit of FIG. 2, showing selected signals over time.
Figure 4:
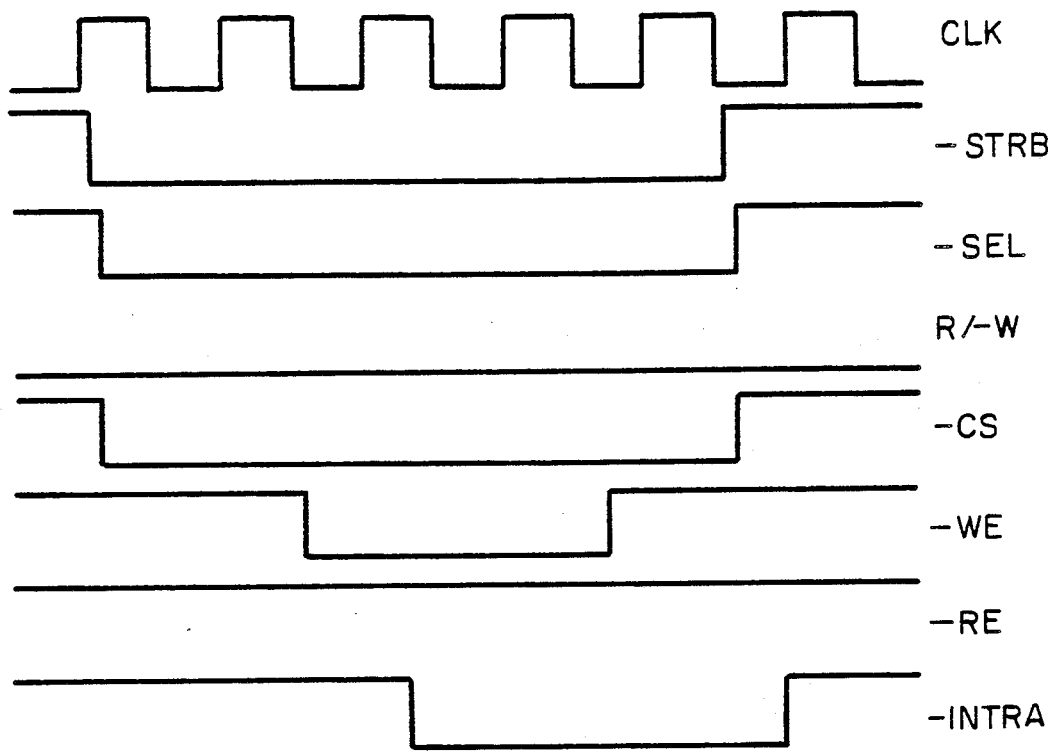
FIG. 4 is a timing diagram for the circuit of FIG. 2, showing selected signals over time.
Figure 4:
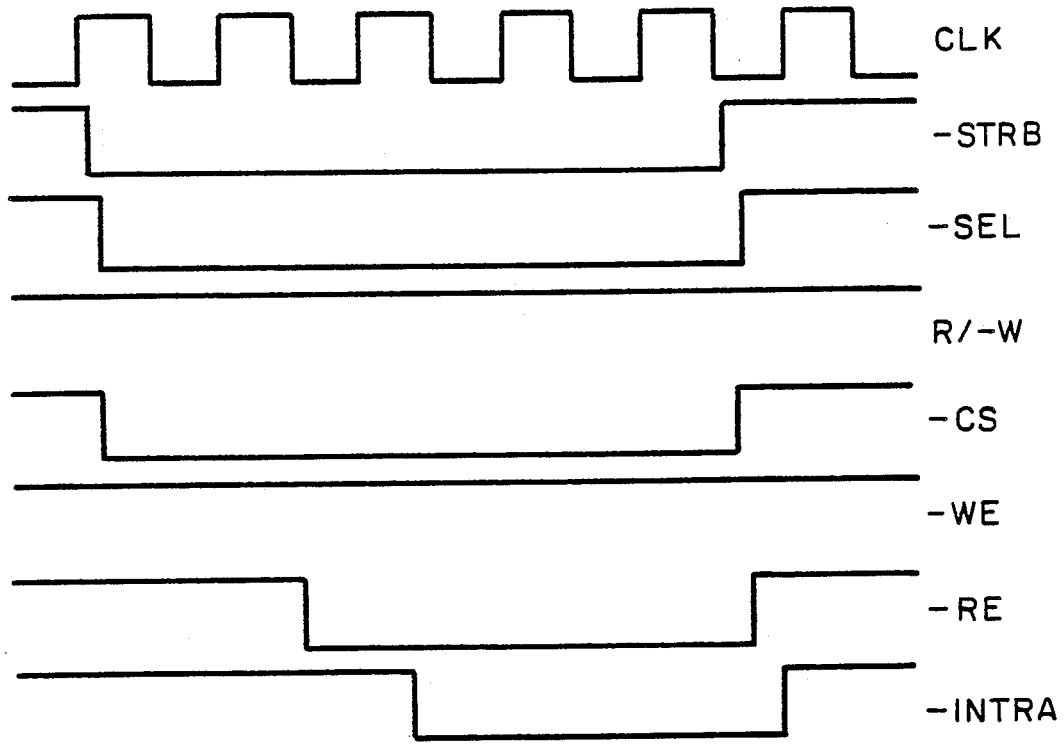

The first falling edge of CLK, as shown in FIG. 3, clocks the logic low from -STRB into D-FF 203. The second falling edge of CLK clocks the logic low from D-FF 203 into D-FF 204. The output of D-FF 204 forces drivers 200 and 201 to a high impedance state, and through gate 207, enables driver 202 which connects the DSP's data bus to the serial controller DAL bus. Driver 202 also receives the R/-W signal from the DSP which it uses to determine the direction of data flow through driver 202. The R/-W signal is further combined with the output of D-FF 204 by gate 212 and 213 to generate either the -RE or -WE signal, signifying a read access or a write access respectively.

The third falling edge of CLK clocks the logic low from D-FF 204 into D-FF 205. The output of D-FF 205 (-RDY) signals to the DSP that the serial controller is ready to continue. The output of D-FF 205 also enables the interrupt acknowledge signal through gate 214 (see FIG. 4). The fourth falling edge of CLK, clocks the logic low from D-FF 205 into D-FF 206. The output of D-FF 206 forces the -WE signal to a logic high.

Subsequent falling edges of CLK produce no change in the interface circuit until -SEL returns to a logic high at which time the interface circuit is reset and ready for the next access.

As the DSP's speed increases, the timing generator may need additional D-FF to ensure proper access time to the serial controller. The number of D-FF can be estimated with the knowledge of both the access time of the serial controller and the period of the DSP's clock signal.

The compactness of this embodiment allows this interface circuit to be implemented in a Programmable Array Logic (PAL) or Erasable Programmable Logic Device (EPLD). By using one of these logic devices, substantial space and power can be saved. Since the timing generator is synchronized to the DSP's clock, the control signal from the decoder section are generated synchronously making this a completely synchronous design.

Although the preferred embodiment of the invention has been illustrated, and that form described, it will be readily apparent to those skilled in the art that various modifications may be made therein without departing from the spirit of the invention or from the scope of the appended claims.

What is claimed is:

1. An interface circuit for connecting a processor means to a controller means, said processor means having an address bus and a data bus, said controller means having a multiplexed data and address bus, said interface circuit arranged to generate a plurality of control signals which defines the type of access being performed, said interface circuit comprising;
    multiplexer means for converting said address bus and said data bus of said processor means to said multiplexed data and address bus of said controller means;
    timing generator means arranged to receive a clock signal from said processor means, said timing generator means further arranged to track the number of cycles of said clock signal, and;
    decoder means for decoding said number of cycles from said timing generator means and generating said plurality of control signals.

2. An interface circuit as claimed in claim 1, wherein said multiplexer means is arranged to receive a first control signal from said decoder means, said multiplexer means responsive to receiving said first control signal, connects said address bus to said multiplexed data and address bus, and alternatively said multiplexer means responsive to an absence of said first control signal, connects said data bus to said multiplexed data and address bus.

3. An interface circuit as claimed in claim 1, wherein said timing generator means is arranged to receive said clock signal from said processor means, a first indication signal from said processor means and a second indication signal from said processor means, and responsive to receiving said first indication signal and said second indication signal, said timing generator means generates an output signal which represents said number of cycles of said clock signal.

4. An interface circuit as claimed in claim 1, wherein said multiplexer means is arranged to receive a direction signal from said processor means, said direction signal defines a direction of flow through said multiplexer means.

5. An interface circuit as claimed in claim 3, wherein said first indication signal from said processor means signifies that said processor means is performing an access which is external to said processor means, and said second indication signal from said processor means signifies that said processor means is accessing said controller means.

6. An interface circuit as claimed in claim 3, wherein said decoder means is arranged to receive said timing generator means output signal generating said plurality of control signals.

7. An interface circuit for connecting a processor means to a controller means, said processor means having an address bus and a data bus, said controller means having a multiplexed data and address bus, said interface circuit arranged to generate a plurality of control signals which defines the type of access being performed, said interface circuit comprising;
    timing generator means arranged to receive a clock signal from said processor means, a first indication signal from said processor means and a second indication signal from said processor means, and responsive to receiving said first indication signal and said second indication signal, said timing generator means generates an output signal which represents the number of cycles of said clock signal;
    decoder means for decoding said number of cycles from said timing generator means and generating said plurality of control signals, and;
    multiplexer means arranged to receive a first control signal from said decoder means, said multiplexer means responsive to receiving said first control signal connects said address bus to said multiplexed data and address bus, and alternatively, said multiplexer means responsive to an absence of said first control signal, connects said data bus to said multiplexed data and address bus.

8. An interface circuit as claimed in claim 7, wherein said multiplexer means is arranged to receive a direction signal from said processor means, wherein, said direction signal defines a direction of flow through said multiplexer means.

9. An interface circuit as claimed in claim 7, wherein said first indication signal from said processor means signifies that said processor means is performing an access which is external to said processor means, and said second indication signal from said processor means signifies that said processor means is accessing said controller means.

10. An interface circuit as claimed in claim 7, wherein said decoder means is arranged to receive said timing generator means output signal generating said plurality of control signals.

11. An interface circuit for connecting a processor means to a controller means, said processor means having an address bus and a data bus, said controller means having a multiplexed data and address bus, said interface circuit arranged to generate a plurality of control signals which defines the type of access being performed, said interface circuit comprising;

timing generator means arranged to receive a clock signal from said processor means, a first indication signal from said processor means which signifies that said processor means is performing an access which is external to said processor means, and a second indication signal from said processor means which signifies that said processor means is accessing said controller means, responsive to receiving said first indication signal and said second indication signal, said timing generator means generates a plurality of signals which represent a number of cycles of said clock signal;

decoder means arranged to receive said plurality of signals from said timing generator means and generate said plurality of control signals, and;

multiplexer means arranged to receive a first control signal from said decoder means, said multiplexer means responsive to receiving said first control signal connects said address bus to said multiplexed data and address bus, and alternatively, said multiplexer means responsive to an absence of said first control signal, connects said data bus to said multiplexed data and address bus, and said multiplexer means further arranged to receive a direction signal from said processor means, wherein, said direction signal defines a direction of flow through said multiplexer means.

* * * * *